(12) United States Patent
Tkaczyk et al.

(10) Patent No.: US 7,486,764 B2
(45) Date of Patent: Feb. 3, 2009

(54) METHOD AND APPARATUS TO REDUCE CHARGE SHARING IN PIXELLATED ENERGY DISCRIMINATING DETECTORS

(75) Inventors: John Eric Tkaczyk, Delanson, NY (US); Yanfeng Du, Rexford, NY (US); Wen Li, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 39 days.

(21) Appl. No.: 11/625,969

(22) Filed: Jan. 23, 2007

(65) Prior Publication Data
US 2008/0175347 A1    Jul. 24, 2008

(51) Int. Cl.
*H01L 27/146* (2006.01)
*G01N 23/00* (2006.01)
(52) U.S. Cl. .................... 378/19; 250/370.09
(58) Field of Classification Search .......... 378/19, 378/98.8; 250/370.09
See application file for complete search history.

(56) References Cited

U.S. PATENT DOCUMENTS

| | | | |
|---|---|---|---|
| 2003/0132391 A1* | 7/2003 | Agano | 250/370.11 |
| 2005/0023475 A1* | 2/2005 | Li et al. | 250/370.09 |
| 2007/0114426 A1* | 5/2007 | Tkaczyk | 250/370.09 |
| 2007/0189444 A1* | 8/2007 | Van Steven-Daal et al. | 378/6 |

* cited by examiner

*Primary Examiner*—Hoon Song
(74) *Attorney, Agent, or Firm*—Jason K. Klindtworth

(57) ABSTRACT

A CT detector includes a plurality of metallized anodes with each metallized anode separated from another metallized anode by a gap. A direct conversion material is electrically coupled to the plurality of metallized anodes and has a charge sharing region in which an electrical charge generated by an x-ray impinging the direct conversion material is shared between at least two of the plurality of metallized anodes. An x-ray attenuating material is positioned to attenuate x-rays directed toward the charge sharing region.

25 Claims, 9 Drawing Sheets

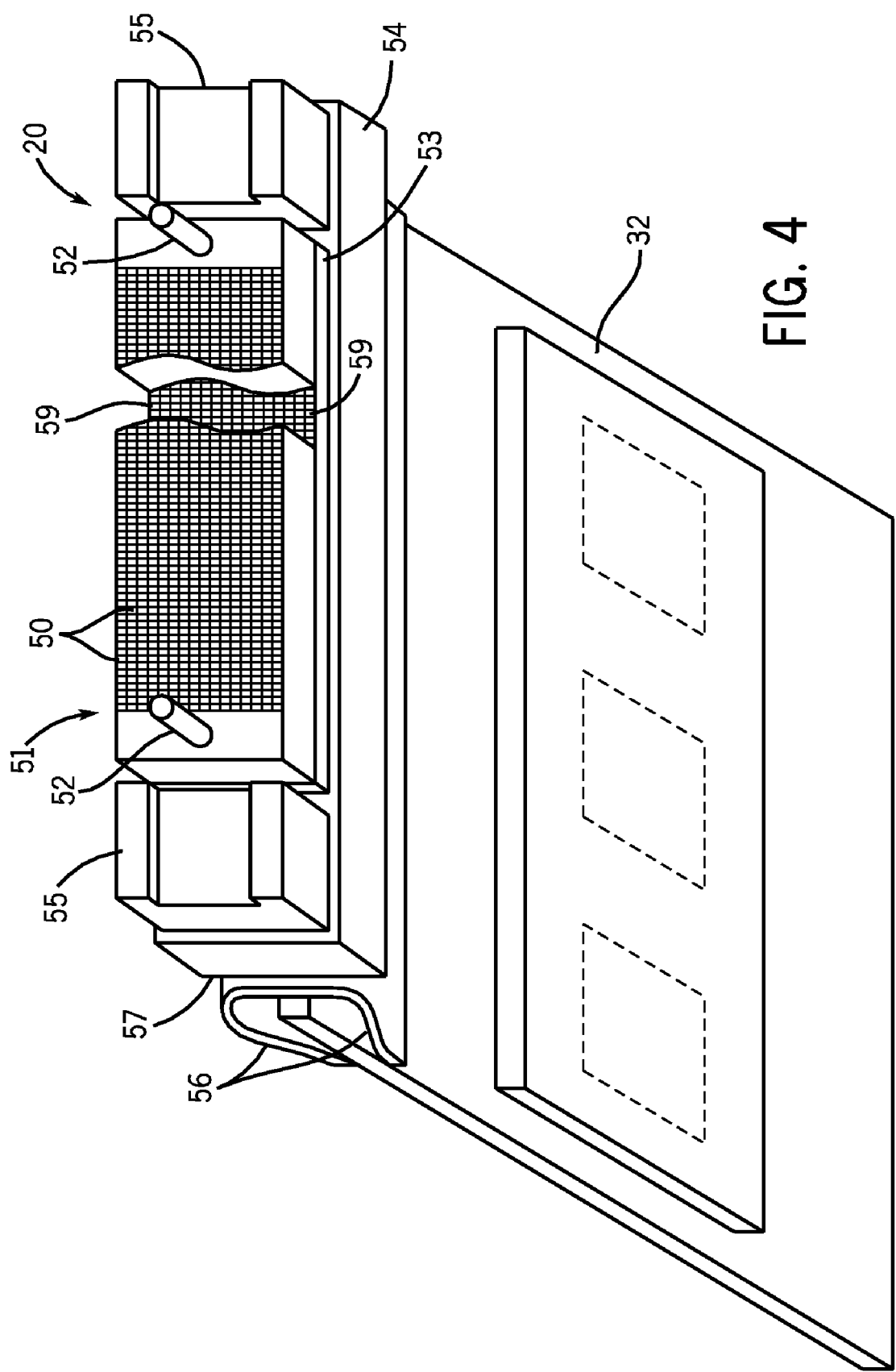

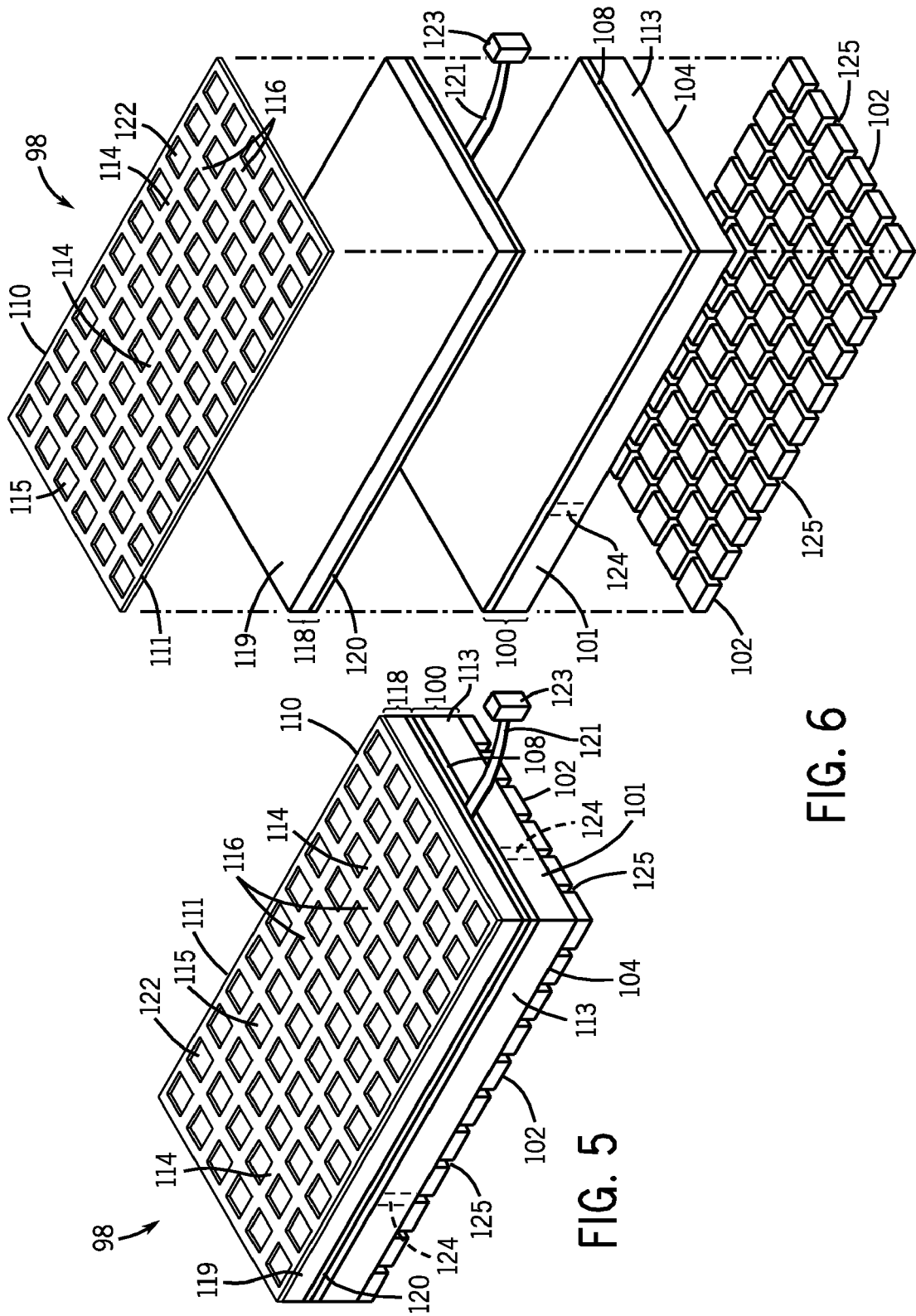

METHOD AND APPARATUS TO REDUCE CHARGE SHARING IN PIXELLATED ENERGY DISCRIMINATING DETECTORS

BACKGROUND OF THE INVENTION

The present invention relates generally to diagnostic imaging and, more particularly, to a direct conversion detector capable of providing photon count and/or energy data with reduced charge sharing between pixels of the direct conversion detector.

Typically, in radiographic imaging systems, such as x-ray and computed tomography (CT), an x-ray source emits x-rays toward a subject or object, such as a patient or a piece of luggage. Hereinafter, the terms "subject" and "object" may be interchangeably used to describe anything capable of being imaged. The beam, after being attenuated by the subject, impinges upon an array of radiation detectors. The intensity of the attenuated beam radiation received at the detector array is typically dependent upon the attenuation of the x-rays. Each detector element of the detector array produces a separate electrical signal indicative of the attenuated beam received by each detector element. The electrical signals are transmitted to a data processing system for analysis which ultimately produces an image.

In some CT imaging systems, for example, the x-ray source and the detector array are rotated within a gantry and within an imaging plane around the subject. X-ray sources for such CT imaging systems typically include, but are not limited to, x-ray tubes, solid state x-ray source, thermionic x-ray sources, and field emitters which emit the x-rays as a fan beam emanating from a focal point. X-ray detectors for such CT imaging systems are typically configured in a circular arc centered to a focal spot. In addition, such detectors include a collimator for collimating x-ray beams received at the detector which focus to a focal spot. Such detectors include a scintillator for converting x-rays to light energy adjacent the collimator and a photodiode for receiving the light energy from an adjacent scintillator and producing electrical signals therefrom. Typically, each scintillator of a scintillator array converts x-rays to light energy. Each photodiode detects the light energy and generates a corresponding electrical signal as a function of the light emitted by a corresponding photodiode. The outputs of the photodiodes are then transmitted to the data processing system for image reconstruction.

Conventional CT imaging systems utilize detectors that convert radiographic energy into current signals that are integrated over a time period, then measured and ultimately digitized. A drawback of such detectors however is their inability to provide data or feedback as to the number and/or energy of photons detected. That is, conventional CT detectors have a scintillator component and photodiode component wherein the scintillator component illuminates upon reception of radiographic energy and the photodiode detects illumination of the scintillator component and provides an electrical signal as a function of the intensity of illumination. Under the charge integration operation mode, the photodiode is not capable of discriminating between the energy level or the photon count from the scintillation. For example, two scintillators may illuminate with equivalent intensity and, as such, provide equivalent output to their respective photodiodes. Yet, the number of x-rays received by each scintillator may be different as well as the x-rays intensity, but yield an equivalent light output.

Energy discriminating, direct conversion detectors are capable of not only x-ray counting, but also providing a measurement of the energy level of each x-ray detected. Consequently, such a detector could potentially be used for SPECT or PET imaging. Energy discriminating detectors can also be used to give compositional information of an imaged object by applying a material discrimination algorithm on measured energy levels. While a number of materials may be used in the construction of a direct conversion energy discriminating detector, semiconductors such as typically Cadmium Zinc Telluride (CZT), Cadmium Telluride (CdTe) and the like have been shown to be preferred materials.

In a typical imaging application, x-rays are absorbed in the direct conversion material which results in creation of an electrical charge in the direct conversion material. In order to create digital image information, the charge generated is collected on segmented anodes typically using either charge integration or charge pulse counting electronics.

A drawback of direct conversion semiconductor detectors, however, is that x-rays absorbed in the direct conversion material near the gaps or perimeters of the anodes can result in a charge being generated therein that is shared by at least two neighboring pixel anodes. When using charge integration electronics, charge sharing can manifest itself as crosstalk between neighboring pixels, thus rendering the electronics susceptible to electronic noise amplification and spatial blurring of the image. When using pulse counting electronics, charge sharing can result in dividing the charge between at least two anodes, resulting in lost counts when the amplitude of the charge pulse collected in at least one of the anodes is below a discrimination threshold. Additionally, when pulse counting, high energy x-rays can result in loss of detection quantum efficiency (DQE) by the creation of two or more counts being collected in two or more neighboring anodes, thus mis-counting the events and binning, for instance, a single high energy event as two or more low-energy events. The mis-counting of events and binning with respect to energy will degrade the capability for material discrimination.

Another drawback of direct conversion semiconductor detectors with regard to CT imaging is that the response at the edge and corners of the direct conversion crystal is not reproducible. Such locations of a direct conversion crystal typically have charge trapping centers that cause changes in the internal electric field as the incident x-ray flux changes. The changing internal field can cause a poor detector response that can lead to a non-optimal image.

Another drawback of direct conversion semiconductor detectors with regard to CT imaging is that these types of detectors cannot count at the very high x-ray photon flux rates typically encountered with conventional CT systems, e.g., at or above 5-100 million counts per sec per millimeter squared (Mcps). The very high x-ray photon flux rate causes pile-up and polarization, which ultimately can lead to detector saturation. That is, these detectors typically saturate at relatively low x-ray flux level thresholds. Above these thresholds, the detector response is not predictable or has degraded dose utilization. Saturation can occur at detector locations wherein small subject thickness is interposed between the detector and the radiographic energy source or x-ray tube. It has been shown that these saturated regions correspond to paths of low subject thickness near or outside the width of the subject projected onto the detector fan-arc. In many instances, the subject is more or less circular or elliptical in the effect on attenuation of the x-ray flux and subsequent incident intensity to the detector. In this case, the saturated regions represent two disjointed regions at extremes of the fan-arc. In other instances, saturation occurs at other locations and in more than two disjointed regions of the detector. In the case of an elliptical subject, the saturation at the edges of the fan-arc is reduced by the imposition of a bowtie filter between the subject and the x-ray source. Typically, the filter is constructed to match the shape of the subject in such a way as to equalize total attenuation, filter and subject, across the fan-arc. The flux incident to the detector is then more closely uniform across the fan-arc and does not result in saturation. However, the bowtie filter may not be optimal given that a subject population is significantly less than uniform and not exactly elliptical in shape. In such cases, it is possible for one or more disjointed regions of saturation to occur or, conversely, to over-filter the x-ray flux and create regions of very low flux. Low x-ray flux in the image projection tends to increase noise in the reconstructed image of the subject.

Detector saturation causes loss of imaging information and results in artifacts in x-ray projection and CT images. In addition, hysteresis and other non-linear effects occur at flux levels near detector saturation as well as at flux levels over detector saturation. Direct conversion detectors are susceptible to a phenomenon called "polarization," where charge trapping inside the material changes the internal electric field, alters the detector count and energy response in an unpredictable way, and results in hysteresis where response is altered by previous exposure history. In particular, photon counting, direct conversion detectors saturate due to the intrinsic charge collection time (i.e., dead time) associated with each x-ray photon event. Saturation will occur due to pulse pile-up when the x-ray photon absorption rate for each pixel is on the order of the inverse of the charge collection time.

A number of techniques have been developed to address charge-sharing in direct conversion detectors. Energy discriminating detectors typically comprise a number of segmented anodes that define a pixellated structure onto which the direct conversion material is electrically attached. The anodes define the response area of the imaging pixels which segment the area of the detection plane. Smaller pixels are generally desirable because they make available higher spatial resolution information which can result in higher resolution images and because the flux rate capability is generally improved with smaller pixels. However, smaller pixel size can result in higher cost because there are more channels per unit area which need to be connected to readout electronics. In addition, smaller pixels or detector elements have larger perimeter-to-area ratios resulting in a larger percentage of charge sharing regions per unit area of the detector.

Because the perimeters of the pixels is the region where a charge may be shared between two or more pixels, incomplete energy information and/or a miscount of x-ray photons occurs for such a charge because the readout electronics are not configured to combine near-simultaneous signals in neighboring pixels. Readout electronics could incorporate a time-coincidence circuit configured to identify events occurring within a defined time window that, once identified, prevents the detected event from receiving a bin count. However, such electronics can be costly and difficult to implement. A time-coincidence circuit would also not adequately preserve energy information about the x-ray event shared between two or more pixels without suffering degradation due to chance coincidence occurring with the near simultaneous arrival of two or more photons in neighboring regions.

To solve the problem regarding the reproducibility of the response at the edges and corners of the direct conversion crystal, a guard ring is typically placed on the anode surface of the device or on side walls of the crystal walls. However, a guard ring does not prevent trapping of charge within the semiconductor, and a guard ring does not prevent a changing electric field from developing within the semiconductor.

Therefore, it would be desirable to design a CT apparatus and method to reduce charge sharing between pixels of the direct conversion detector.

BRIEF DESCRIPTION OF THE INVENTION

The present invention provides a method and apparatus that overcome the aforementioned drawbacks.

According to an aspect of the present invention, a CT imaging system includes a plurality of metallized anodes with each metallized anode separated from another metallized anode by a gap. A direct conversion material is electrically coupled to the plurality of metallized anodes and has a charge sharing region in which an electrical charge generated by an x-ray impinging the direct conversion material is shared between at least two of the plurality of metallized anodes. An x-ray attenuating material is positioned to attenuate x-rays directed toward the charge sharing region.

According to another aspect of the present invention, a method of fabricating a CT detector includes providing a plurality of metallized anodes and separating the plurality of metallized anodes one from another by a gap. The method further includes attaching a direct conversion material to the plurality of metallized anodes and positioning an x-ray absorbing material such that x-rays directed toward a charge sharing region of the direct conversion material are absorbed.

According to yet another aspect of the present invention, a CT system includes a rotatable gantry having an opening to receive an object to be scanned. A high frequency electromagnetic energy projection source is configured to project a high frequency electromagnetic energy beam toward the object and a detector is positioned to receive x-rays that pass through the object. The detector includes a pair of electrical charge detectors having a gap therebetween, a direct conversion material electrically coupled to the pair of electrical charge detectors, and an x-ray blocker positioned between the high frequency electromagnetic energy beam and the direct conversion material and configured to block x-rays directed toward a region of the direct conversion material capable of generating a charge detectable by each of the pair of electrical charge detectors.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 4 is a perspective view of one embodiment of a detector.

FIG. 5 is a perspective view of one embodiment of a direct conversion CT detector.

FIG. 6 is a perspective, expanded view of components of a direct conversion detector according to an embodiment of the present invention.

DETAILED DESCRIPTION OF THE PREFERRED EMBODIMENT

The operating environment of the present invention is described with respect to a sixty-four-slice computed tomography (CT) system. However, it will be appreciated by those skilled in the art that the present invention is equally applicable for use with other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems.

Figure 1:
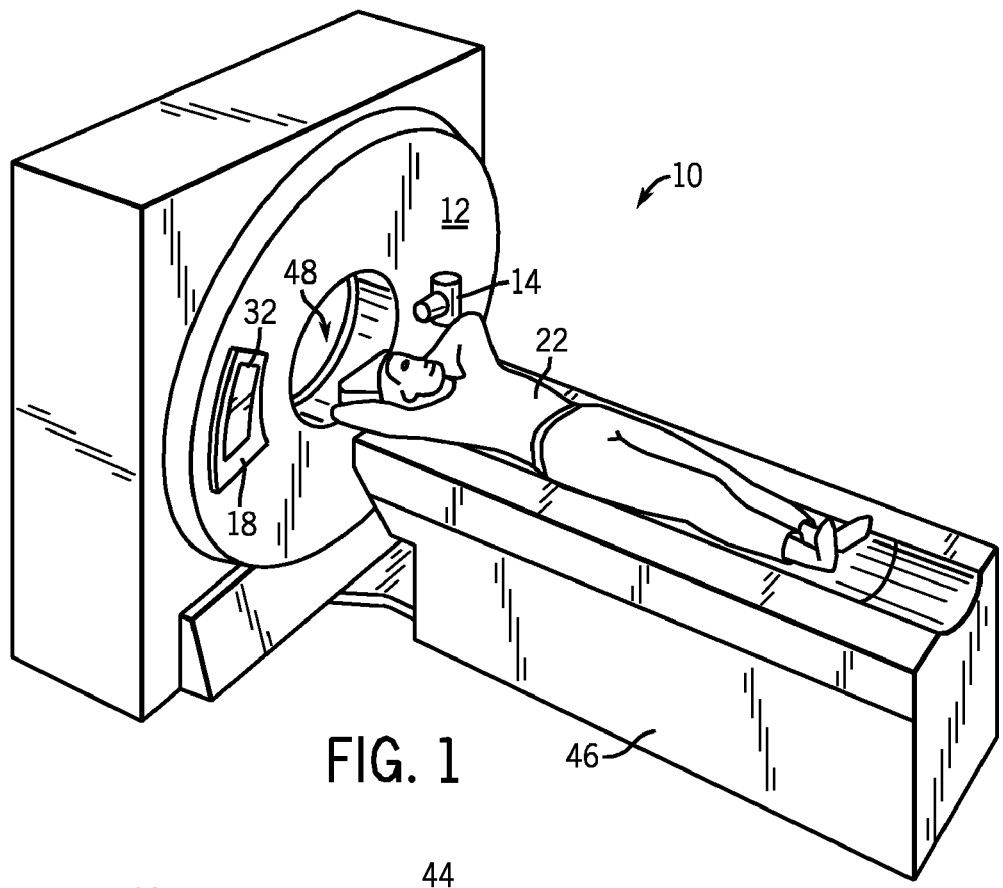
FIG. 1 is a pictorial view of a CT imaging system.
Figure 2:
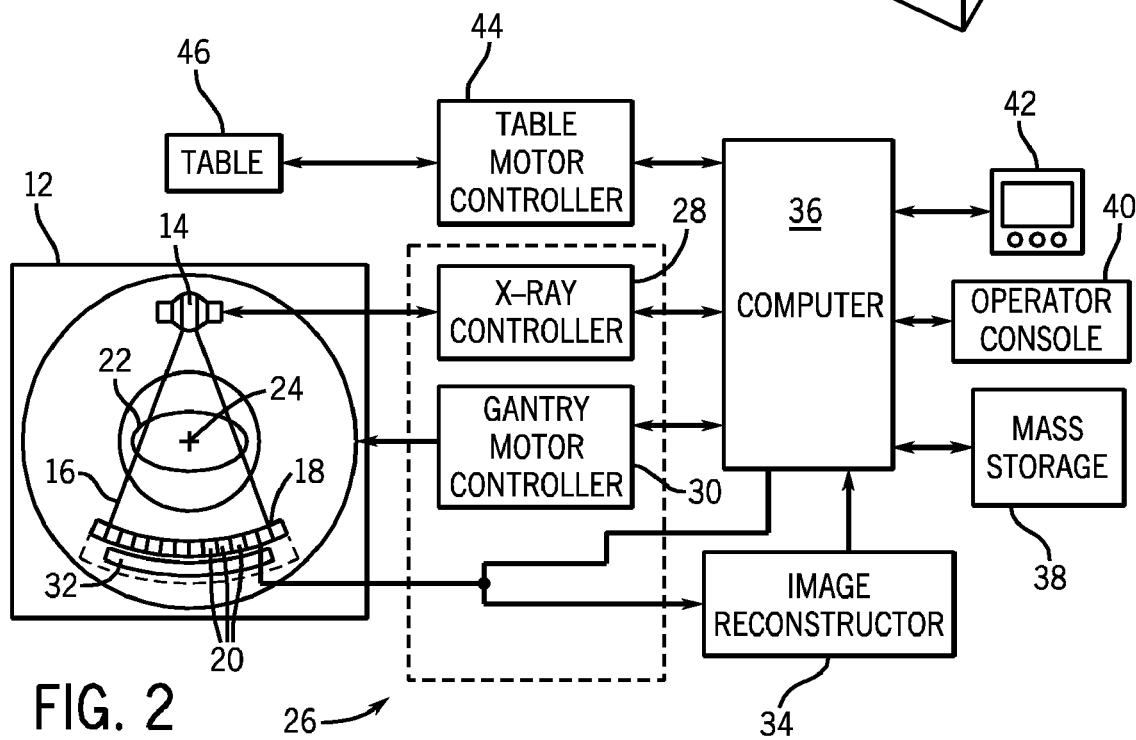
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector assembly or collimator 18 on the opposite side of the gantry 12. Detector assembly 18 is formed by a plurality of detectors 20 and data acquisition systems (DAS) 32. The plurality of detectors 20 sense the projected x-rays that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figure 3:
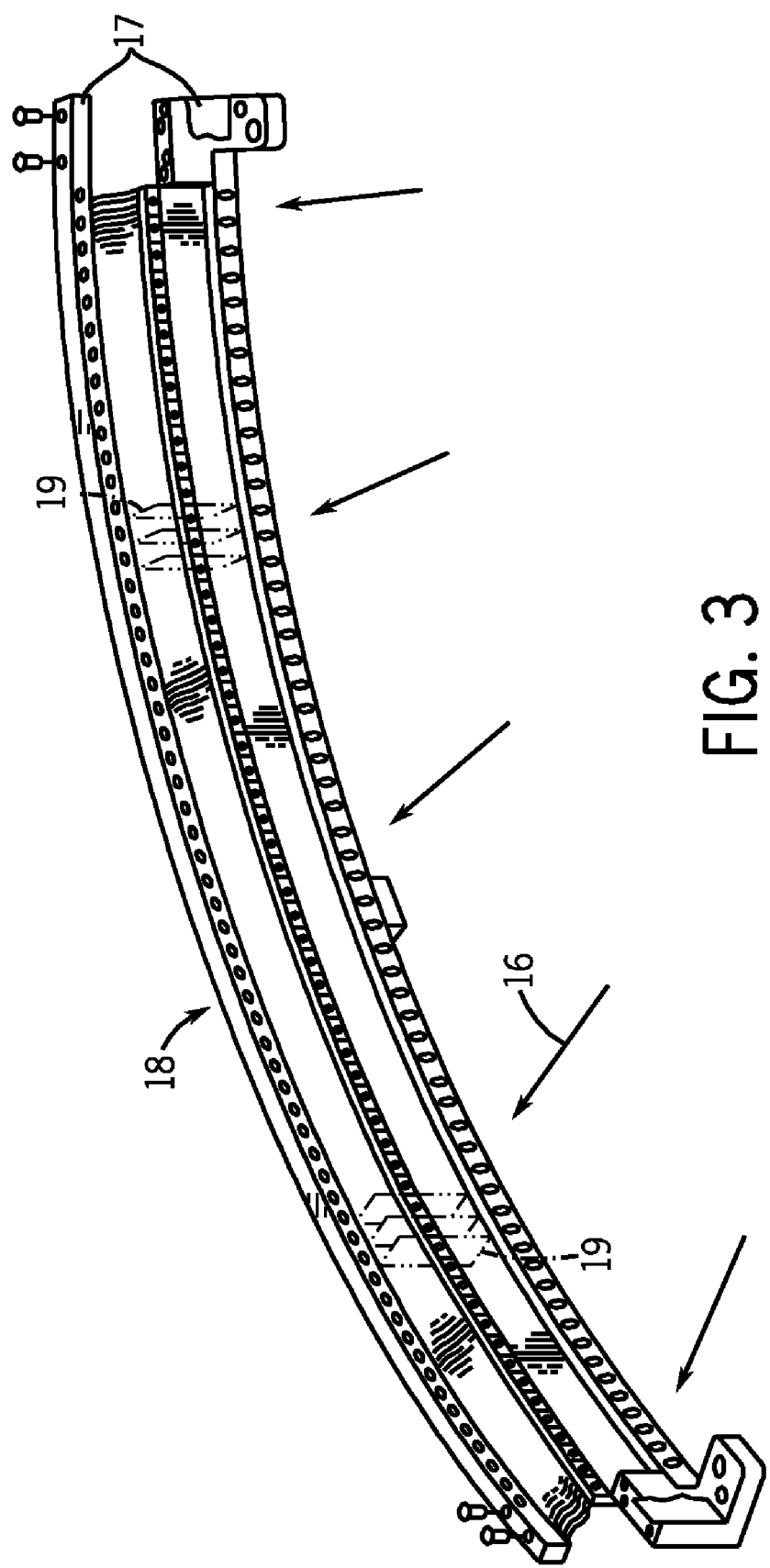
FIG. 3 is a perspective view of one embodiment of a CT system detector array.

As shown in FIGS. 3 and 4, detector assembly 18 includes a plurality of detectors 20 and DAS 32, with each detector 20 including pixel or detector elements 50 arranged in pack 51. Rails 17 of the detector assembly 18 have collimating blades or plates 19 placed therebetween. Detector assembly 18 is positioned to collimate x-rays 16 before such beams impinge upon the detector 20. In one embodiment, shown in FIG. 3, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Detectors 20 include pins 52 positioned within pack 51 relative to detector elements 50. Pack 51 is positioned on diode array 53 having a plurality of diodes 59. Diode array 53 is in turn positioned on multi-layer substrate 54. Spacers 55 are positioned on multi-layer substrate 54. Detector elements 50 are optically coupled to diode array 53, and diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In operation, x-rays impinging within detector elements 50 generate photons which traverse pack 51, thereby generating an analog signal which is detected on a diode 58 within diode array 53. The analog signal generated is carried through multi-layer substrate 54, through one of flex circuits 56, to DAS 32 wherein the analog signal is converted to a digital signal.

In an embodiment of the present invention, each detector is designed to directly convert radiographic energy to electrical signals containing energy discriminatory or photon count data. The present invention contemplates a number of configurations for these detectors, its components, and the manner in which data is read out. In a preferred embodiment, the semiconductors are fabricated from Cadmium Telluride or Cadmium Zinc Telluride (CZT). However, one skilled in the art will readily recognize that other materials capable of the direct conversion of radiographic energy may be used. As will be described, a grid assembly is positioned between a direct conversion material and an x-ray source to attenuate x-rays directed toward gaps between anodes that form the direct conversion detector. These grids provide improved detector performance and reduce charges generated in a region of the direct conversion wherein the charges generated would otherwise be shared between neighboring anodes of the direct conversion detector.

It is generally well known that an x-ray impinging on a direct conversion material will generate a charge in the bulk of the direct conversion material that migrates through the direct conversion material to an anode structure that is positioned to collect the charge. Operation of the detector in an imaging application requires measurement of the charge by collecting the charge on segmented anodes. The segmented anodes define the response area of the detection plane. However, when an x-ray impinges the direct conversion material in a region near the gaps between the anodes, the charge is shared between at least two neighboring anodes. Such charge sharing can result in image artifacts.

Generally, in order to create an image using a direct conversion detector, either charge integration or charge pulse counting electronics are employed. For charge integration, the charge is integrated over the area of the pixel and the integrated charge is used to generate a digital signal indicative of x-ray count and also providing a measurement of the energy level of each x-ray detected. For pulse counting, the amplitude of the current pulse is compared to a threshold level and stored in bin counters in order to record photon energy.

Referring now to FIGS. 5 and 6, a portion of an x-ray detector 98 in accordance with one embodiment of the present invention is shown. Detector 98 includes a semiconductor layer 100 having a direct conversion material 101 constructed preferably of a semiconductor material such as Cadmium Zinc Telluride (CZT), Cadmium Telluride (CdTe), and the like. Semiconductor layer 100 also has electrical charge detectors, or metallized contacts 102 attached to a surface 104 of the direct conversion material 101.

In a preferred embodiment, metallized surface 108 is a contiguous high voltage electrode for direct conversion material 101. One skilled in the art will appreciate that high voltage electrode 108 should be relatively thin so as to reduce the x-ray absorption characteristics. Accordingly, high voltage electrode 108 is preferably a few hundred angstroms thick. The high voltage electrode 108 may be affixed to direct conversion material 101 through a metallization process such as vapor deposition and typically includes a metal such as gold, platinum, silver, copper, aluminum, or the like.

Metallized contacts 102 are electrically connected to the layer of direct conversion material 101 and preferably arranged in a two-dimensional pattern. However, one skilled in the art would recognize that contacts 102 may be arranged in other patterns or arrangements such as, for instance, a staggered pixel arrangement with alternate rows shifted. Contacts 102 may also be shaped as hexagons, rectangles, squares, and the like that range typically in size from 0.2 mm to 2.0 mm and have gaps therebetween.

Detector 98 includes an x-ray attenuating grid assembly 110. Grid assembly 110 includes a plurality of bars or rungs 114, 116 interspersed between or along a perimeter frame 111 and forming openings 115. Perimeter frame 111 and rungs 114, 116 are formed at least in part of an x-ray absorbing or blocking material. Perimeter frame 111 is positioned substantially along perimeter 113 of direct conversion material 101. In one embodiment, perimeter frame 111 and rungs 114, 116 are formed of a high atomic number or high density metal such as tungsten, molybdenum, lead, and the like, and have a thickness of, for instance, 0.1-0.5 mm. In another embodiment, perimeter frame 111 and rungs 114, 116 are formed of a polymer filled with powders of, for instance tungsten, molybdenum, lead, and the like, and have a thickness of, for instance, 0.5-1.5 mm. While a thickness of the perimeter frame 111 and rungs 114, 116 may be substantially similar, it is contemplated that the thickness of the perimeter frame 111 may be greater or less than the thickness of rungs 114, 116.

Perimeter frame 111 is positioned to block or attenuate x-rays emitting from an x-ray source, such as x-ray source 14 of FIG. 1, that are directed toward the outer edges or perimeter 127 of direct conversion material 101. Likewise, rungs 114, 116 are positioned to block or attenuate x-rays that emit from the x-ray source, such as x-ray source 14 of FIG. 1, toward charge-sharing regions 124 of direct conversion material 101. Charge-sharing regions 124 are regions of direct conversion material 101 in which an electrical charge generated therein as a result of an x-ray impingement may be shared between at least two electrical contacts 102. In one embodiment, the charge-sharing regions 124 substantially match gaps 125 formed between electrical contacts 102.

Still referring to FIGS. 5 and 6, in an embodiment of the present invention, grid assembly 110 includes optionally a low x-ray attenuating structure or support material 122 positioned between adjacent rungs 114, 116 in openings 115. Support material 122 includes an expanded or extruded low density polymeric filler material such as polystyrene, polymethacrylimide, polyvinylchloride, polyurethane, polyethylene, and the like. Support material 122 serves as a structural membrane to provide additional support to grid assembly 110. Because support material 122 is low x-ray attenuating, most of the x-rays directed toward support material 122 pass therethrough.

In a preferred embodiment, detector 98 includes an insulation assembly 118 positioned between semiconductor layer 100 and grid assembly 110. A high voltage insulation material 119 is preferably constructed of a polymeric film having high voltage insulating properties such as mylar, silicon rubber, and polyimide. Insulation assembly 118 also includes a high voltage electrode 120 attached to high voltage insulation material 119. High voltage electrode 120 includes a wire 121 electrically connected to a high voltage power supply 123. High voltage electrode 120 is also electrically connected to high voltage electrode 108 such that voltage is applied from high voltage power supply 123 to high voltage electrode 108 during the x-ray or gamma ray detection process. One skilled in the art will appreciate that high voltage electrode 120 should be relatively thin so as to reduce the x-ray absorption characteristics. In a preferred embodiment, high voltage electrode 120 is a few hundred angstroms thick. The high voltage electrode 120 may be affixed to high voltage insulation material 119 through a metallization process such as vapor deposition and typically includes a metal such as gold, platinum, silver, copper, aluminum, or the like.

Figure 7:
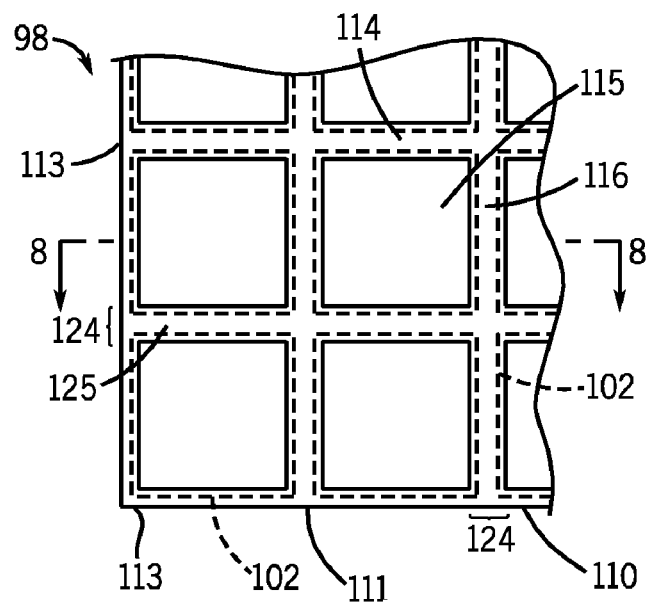
FIG. 7 is a plan view of a grid assembly with direct conversion anode contacts according to an embodiment of the present invention.

Referring to FIG. 7, a plan view of a portion of detector 98 includes perimeter frame 111 of grid assembly 110. Rungs 114, 116 form openings 115 having optional support material 122 positioned therein. Metallized contacts 102, shown in hidden lines, have gaps 125 formed therebetween. Charge-sharing regions 124 formed in direct conversion material 101 have rungs 114, 116 placed thereabove, thus attenuating x-rays that are directed toward charge-sharing regions 124. Likewise, perimeter frame 111 attenuates x-rays directed toward perimeter 113 of direct conversion material 101.

Figure 8:
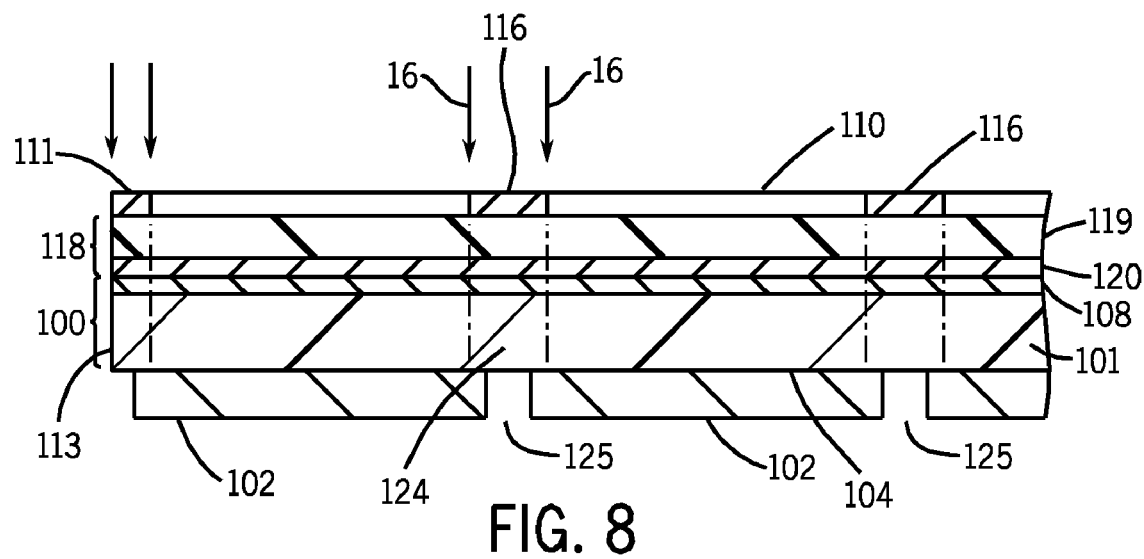
FIG. 8 is an illustration of a charge-sharing region of a direct conversion detector according to an embodiment of the present invention.

Referring now to FIG. 8, a side plan view of detector 98 is shown. Direct conversion material 101 has metallized contacts 102 attached thereto on surface 104 and gaps 125 formed between adjacent contacts 102. High voltage electrode 108 is formed on direct conversion material 101 forming semiconductor layer 100. Insulation material 119 having high voltage electrode 120 attached thereto and forming insulation assembly 118 is positioned on high voltage electrode 108 of semiconductor layer 100. Rungs 116 of grid assembly 110 are positioned to attenuate x-rays 16, of FIGS. 2 and 3, that are directed toward charge-sharing region 124. Perimeter frame 111, likewise, is positioned to attenuate x-rays 16, of FIGS. 2 and 3, that are directed toward perimeter 113 of direct conversion material 101.

Figure 9:
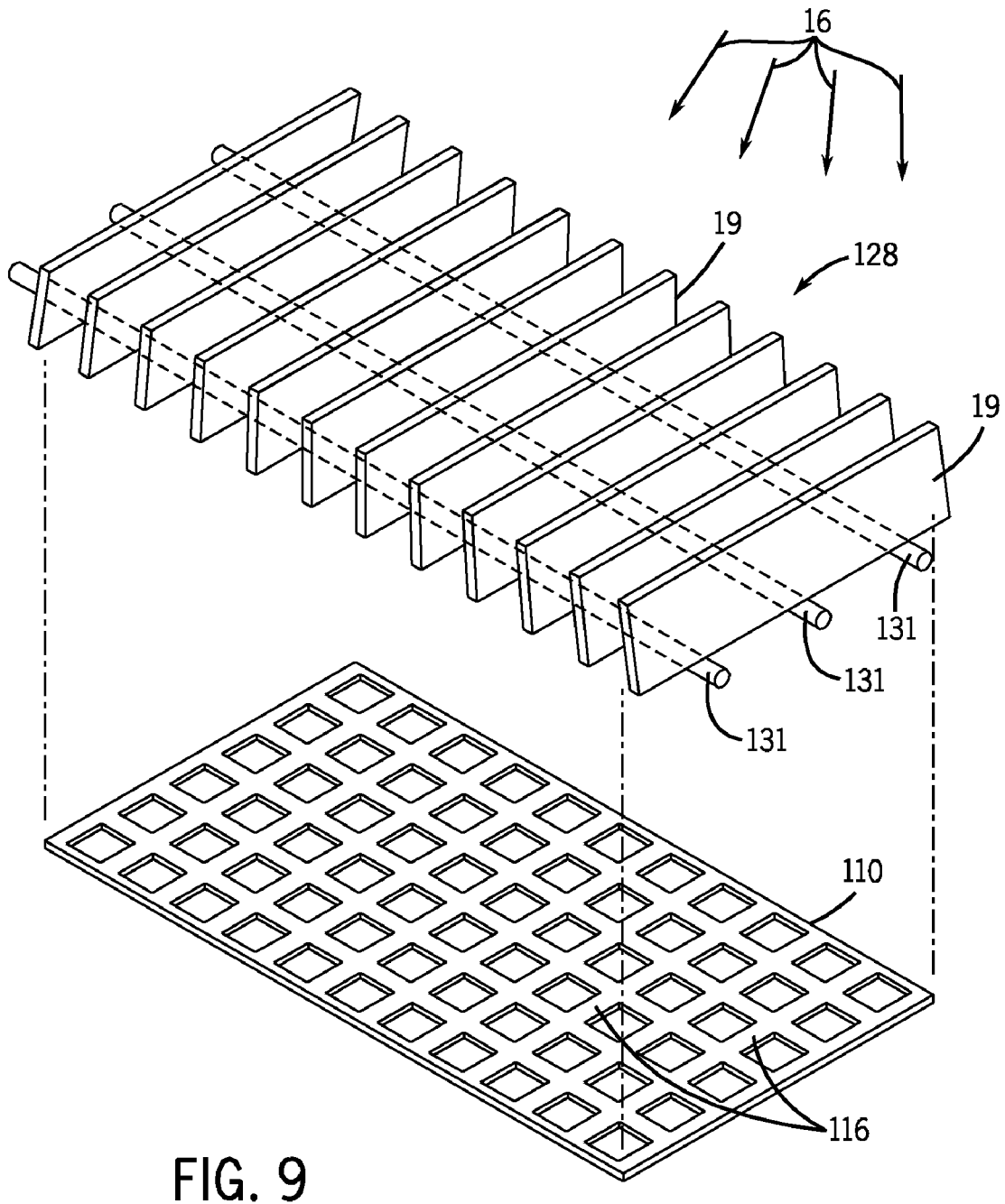
FIG. 9 is an illustration of a grid structure and a collimator assembly according to an embodiment of the present invention.

Referring now to FIG. 9, an anti-scatter assembly 128 in accordance with an embodiment of the present invention is shown. Anti-scatter assembly 128 includes a plurality of blades 19, as illustrated also in FIG. 3, that may be positioned adjacent to or may be integrated with grid assembly 110 and aligned parallel with rungs 116. Blades 19 are positioned in a fanned arrangement such that a plane defined by each blade 19 is substantially parallel with x-rays 16 passing immediately adjacent thereto. Support wires 131 are positioned against plates 19 of detector assembly 18 of FIG. 3.

Anti-scatter assembly 128 may be machined, etched, molded or constructed of stacked laminates. Anti-scatter assembly 128 is preferably fabricated from materials having a high density or high atomic number material such as tungsten, lead, molybdenum, and the like. However, it is contemplated that anti-scatter assembly 128 may be fabricated with polymers having powders of lead, molybdenum, lead, and the like.

Figure 10:
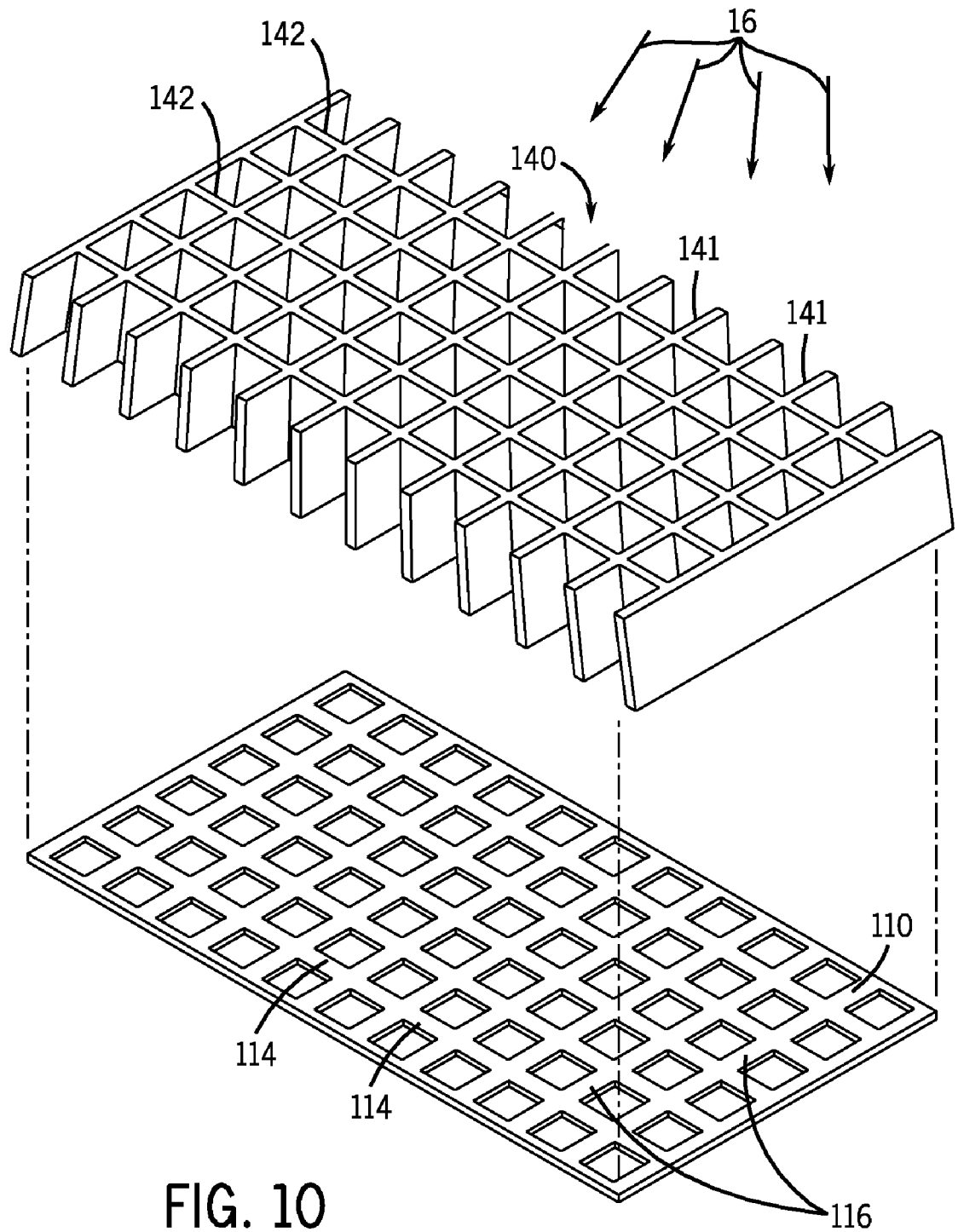
FIG. 10 is an illustration of a grid structure and a collimator assembly according to an embodiment of the present invention.

Referring to FIG. 10, an anti-scatter grid assembly 140 in accordance with another embodiment of the present invention is shown. Anti-scatter assembly 140 includes a first plurality of blades 141 integrated with a second plurality of parallel blades 142 orthogonal to the first plurality of blades 141. Anti-scatter assembly 140 may be positioned adjacent to or may be integrated with grid assembly 110. Blades 141, 142 substantially align with rungs 114, 116 of grid assembly 110, respectively. Plates 141, 142 are preferably positioned in a fanned arrangement with respect to rungs 114, 116 such that planes defined by plates 141, 142 are substantially parallel with x-rays 16 of FIGS. 2 and 3 pass immediately adjacent thereto. Accordingly, plates 141, 142 serve to collimate x-rays 16 and to attenuate x-rays 16 that are directed toward the charge sharing region 124 of FIGS. 5-8.

Anti-scatter assembly 140 may be machined, etched, molded or constructed of stacked laminates. Anti-scatter assembly 140 is preferably fabricated from materials having a high density or high atomic number material such as tungsten, lead, molybdenum, and the like. However, it is contemplated that anti-scatter assembly 140 may be fabricated with polymers having powders of lead, molybdenum, lead, and the like.

Figure 11:
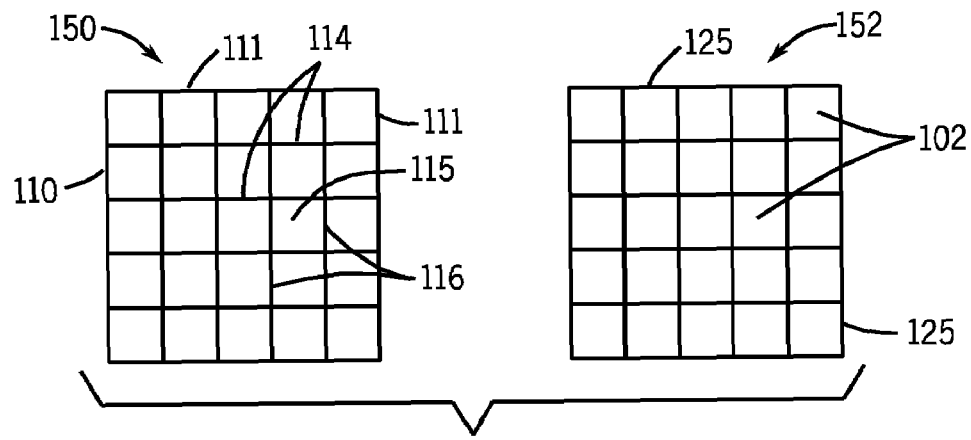
FIG. 11 illustrates a grid-to-pixel pattern according to an embodiment of the present invention.

FIG. 11 illustrates a 1:1 grid-to-pixel arrangement according to an embodiment of the present invention. Grid assembly pattern 150 represents positioning of perimeter material 111 and rungs 114, 116 of grid assembly 110. Pixel pattern 152 represents placement of contacts 102 of semiconductor layer 100. As shown, each contact 102 correlates to a single space opening 115 bordered by rungs 114, 116 and/or perimeter material 111.

Figure 12:
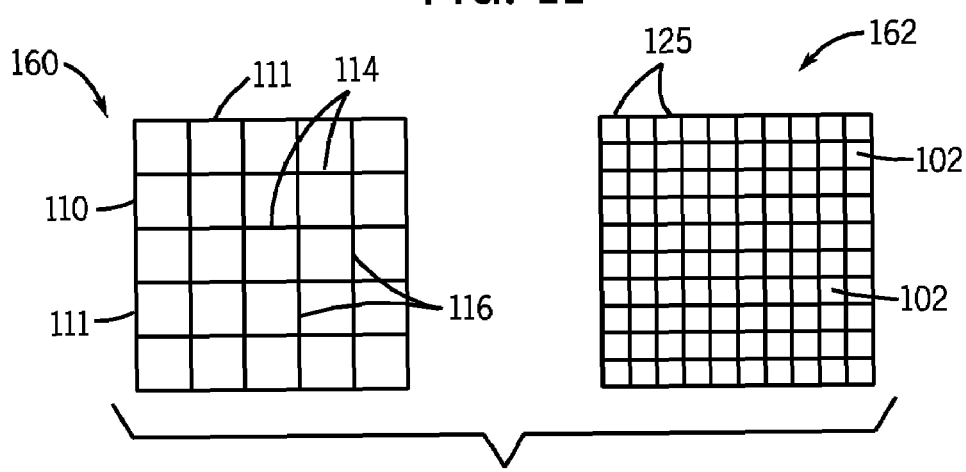
FIG. 12 illustrates a grid-to-pixel pattern according to an embodiment of the present invention.

FIG. 12 illustrates a 1:4 grid assembly pattern 160 to pixel pattern 162. Grid assembly pattern 160 is a pattern of grid assembly 110 that matches pixel pattern 162 of contacts 102 of FIGS. 5 and 6. In this embodiment, contacts 102 of pixel pattern 162 are substantially smaller than the pixel size as illustrated in FIG. 11, thus improving the spatial resolution of detector 98 of FIG. 5. Grid assembly 110 has rungs 114, 116 which substantially match, in the plan view, every other of gaps 125 of contacts 102. Grid assembly 110 has perimeter material 111 which substantially matches perimeter 113 of direct conversion material 101 of FIGS. 5 and 6. One skilled in the art will recognize that anti-scatter blades 19 of FIG. 9 or two-dimensional anti-scatter grid assembly 140 of FIG. 10 may be employed to match the pattern illustrated herein for scatter reduction.

Figure 13:
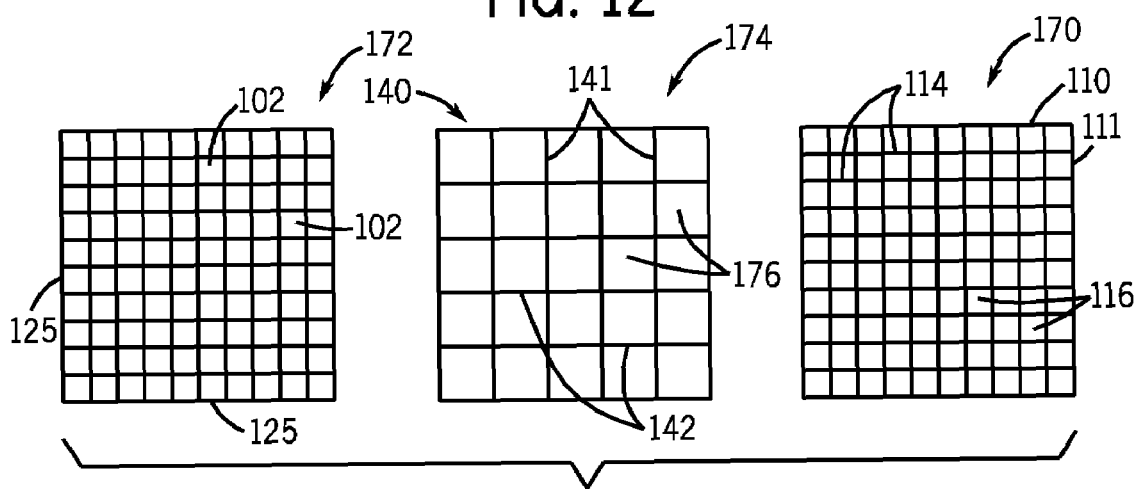
FIG. 13 illustrates a grid-to-pixel pattern according to an embodiment of the present invention.

FIG. 13 illustrates a high resolution pixel pattern 172 having a 1:1 match of grid assembly pattern 170. Grid assembly pattern 170 is a pattern of grid assembly 110 that matches pixel pattern 172 of contacts 102. In this embodiment, contacts 102 of pixel pattern are substantially smaller than the pixel size as illustrated in FIG. 11, thus improving the spatial resolution of detector 98 of FIGS. 5 and 6. Grid assembly 170 has rungs 114, 116 which substantially match, in the plan view, gaps 125 of contacts 102. Grid assembly has perimeter material 111 which substantially matches with perimeter 113 of direct conversion material 101 of FIGS. 5 and 6. One skilled in the art will recognize that anti-scatter blades 19 of FIG. 9 or two-dimensional anti-scatter grid assembly 140 of FIG. 10 may be employed to match the pattern illustrated herein for scatter reduction. In a preferred embodiment, as illustrated in FIG. 13, anti-scatter blades 141, 142 of FIG. 10 have a pattern 174 of openings 176, each of which substantially encompasses four elements of gridded assembly 170 and four elements of pixel pattern 172.

Varying the detector element array size within a single CT detector greatly affects the saturation characteristics of a direct conversion detector. Smaller pixel area implies a higher flux rate saturation threshold relative for a given count rate saturation threshold in proportion to the area reduction. As such, as detector element size decreases, the flux rate limit for the corresponding detector layer increases, thereby, improving the saturation characteristics for the CZT detector. Because flux at a pixel is proportional to its area, the combined flux rate saturation threshold of the smaller pixel patterns of FIGS. 12 and 13 is 4× that which would be achieved by a single pixel, as in FIG. 11, covering the area of the four sub-pixels. In addition, each sub-pixel of FIGS. 12 and 13 will have a faster charge collection time because of a reduction in size relative to the layer thickness. Faster charge collection time is indicative of a larger saturation flux rate limit over and above the improvement in count rate performance achieved simply by a reduction in detector element size.

Figure 14:
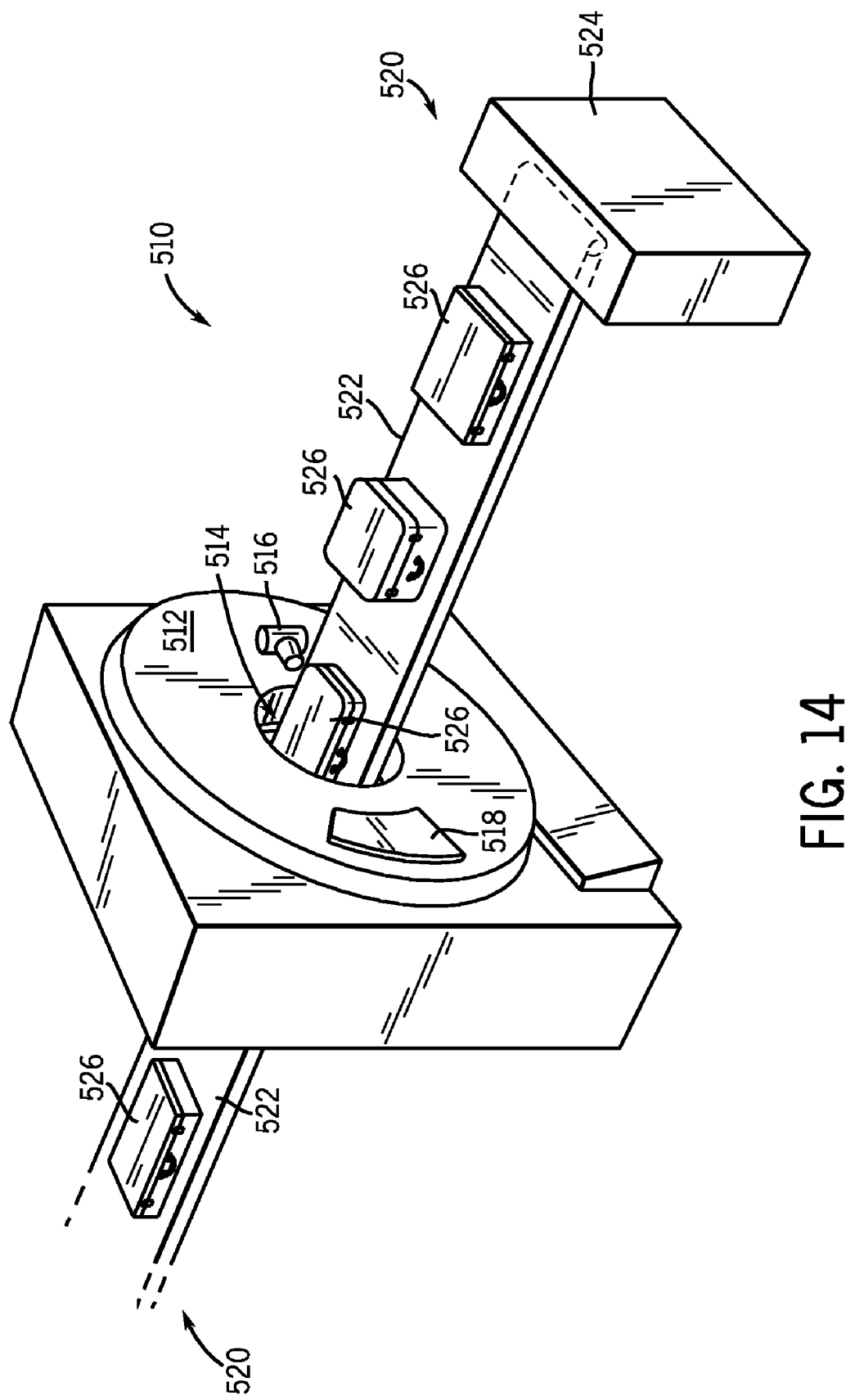
FIG. 14 is a pictorial view of a CT system for use with a non-invasive package inspection system incorporating an embodiment of the present invention.

Referring now to FIG. 14, package/baggage inspection system 510 includes a rotatable gantry 512 having an opening 514 therein through which packages or pieces of baggage may pass. The rotatable gantry 512 houses a high frequency electromagnetic energy source 516 according to an embodiment of the present invention, as well as a detector assembly 518 having scintillator arrays comprised of scintillator cells. A conveyor system 520 is also provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc. Additionally, such systems may be used in industrial applications for non-destructive evaluation of parts and assemblies.

According to one embodiment of the present invention, a detector includes a plurality of metallized anodes with each metallized anode separated from another metallized anode by a gap. A direct conversion material is electrically coupled to the plurality of metallized anodes and has a charge sharing region in which an electrical charge generated by an x-ray impinging the direct conversion material is shared between at least two of the plurality of metallized anodes. An x-ray attenuating material is positioned to attenuate x-rays directed toward the charge sharing region.

According to another embodiment of the present invention, a method of fabricating a CT detector includes providing a plurality of metallized anodes and separating the plurality of metallized anodes one from another by a gap. The method further includes attaching a direct conversion material to the plurality of metallized anodes and positioning an x-ray absorbing material such that x-rays directed toward a charge sharing region of the direct conversion material are absorbed.

According to yet another embodiment of the present invention, a CT system includes a rotatable gantry having an opening to receive an object to be scanned. A high frequency electromagnetic energy projection source is configured to project a high frequency electromagnetic energy beam toward the object and a detector is positioned to receive x-rays that pass through the object. The detector includes a pair of electrical charge detectors having a gap therebetween, a direct conversion material electrically coupled to the pair of electrical charge detectors, and an x-ray blocker positioned between the high frequency electromagnetic energy beam and the direct conversion material and configured to block x-rays directed toward a region of the direct conversion material capable of generating a charge detectable by each of the pair of electrical charge detectors.

The present invention has been described in terms of the preferred embodiment, and it is recognized that equivalents, alternatives, and modifications, aside from those expressly stated, are possible and within the scope of the appending claims.

What is claimed is:

1. A CT detector comprising:
    a plurality of metallized anodes arranged in a two-dimensional array, each metallized anode separated from another metallized anode by a gap;
    a direct conversion material electrically coupled to the plurality of metallized anodes and having a plurality of charge sharing regions in which an electrical charge generated by an x-ray impinging the direct conversion material is shared between at least two of the plurality of metallized anodes; and
    a two-dimensional grid of intersecting rungs of x-ray attenuating material positioned to attenuate x-rays directed toward the plurality of charge sharing regions.

2. The CT detector of claim 1 wherein the x-ray attenuating material is one of tungsten, molybdenum, lead, and a polymer filled with one of tungsten, molybdenum, and lead.

3. The CT detector of claim 1 further comprising a high voltage insulating material positioned between the x-ray attenuating material and the direct conversion material.

4. The CT detector of claim 3 further comprising a metallized surface positioned between the high voltage material and the direct conversion material and attached to a surface of the high voltage insulating material.

5. The CT detector of claim 1 further comprising a metallized surface positioned between the direct conversion material and the x-ray attenuating material and attached to a surface of the direct conversion material.

6. The CT detector of claim 1 further comprising a low density structural material positioned between the rungs of the grid.

7. The CT detector of claim 6 wherein the low density structural material is one of a foam comprising polystyrene, polymethacrylimide, polyvinylchloride, polyurethane, and polyethylene.

8. The CT detector of claim 1 further comprising an anti-scatter collimator having a two-dimensional pattern of plates substantially aligned with the rungs of the two-dimensional grid.

9. The CT detector of claim 1 further comprising a plurality of anti-scatter blades, each placed collinear with a ray extending between the focal spot and a corresponding charge sharing region 10. The CT system of claim 9 wherein each of the plurality of anti-scatter blades is integrated with a corresponding rung of the two-dimensional grid.

11. The CT detector of claim 1 wherein the two-dimensional grid forms a pattern that substantially matches a pattern of gaps formed by the plurality of metallized anodes.

12. The CT detector of claim 11 wherein each of a plurality of openings formed by the grid encompasses four pixels of the direct conversion material.

13. A method of fabricating a CT detector, the method comprising:
    providing a plurality of metallized anodes;
    separating the plurality of metallized anodes one from another by a gap;
    attaching a direct conversion material to the plurality of metallized anodes;
    positioning x-ray absorbing materials such that x-rays directed toward charge sharing regions of the direct conversion material are absorbed; and positioning a structural support material between the x-ray absorbing materials.

14. The method of claim 13 further comprising positioning a high voltage insulating material between the direct conversion material and the x-ray absorbing material.

15. The method of claim 13 further comprising forming the x-ray absorbing material into a two-dimensional grid.

16. The method of claim 13 further comprising positioning at least one x-ray absorbing anti-scatter blade between the x-ray absorbing material and an x-ray source.

17. The CT system of claim 13 wherein the structural support material is a low density structural material.

18. The CT system of claim 17 wherein the low density structural material is one of a foam comprising polystyrene, polymethacrylimide, polyvinylchloride, polyurethane, and polyethylene.

19. A CT system comprising:
    a rotatable gantry having an opening to receive an object to be scanned;
    a high frequency electromagnetic energy projection source configured to project a high frequency electromagnetic energy beam toward the object;
    a detector positioned to receive x-rays that pass through the object, the detector comprising:
        a pair of electrical charge detectors having a gap therebetween;
        a direct conversion material electrically coupled to the pair of electrical charge detectors; and
        an x-ray blocker positioned between the high frequency electromagnetic energy beam and the direct conversion material and configured to block x-rays directed toward a region of the direct conversion material capable of generating a charge detectable by each of the pair of electrical charge detectors; and
    an anti-scatter collimator coupled to the x-ray blocker.

20. The CT system of claim 19 further comprising a high voltage insulation material positioned between the x-ray blocker and the direct conversion material.

21. The CT system of claim 19 wherein the anti-scatter collimator is positioned adjacent to the x ray blocker and between the x-ray blocker and the high frequency electromagnetic energy projection source.

22. The CT system of claim 21 wherein the anti-scatter collimator is a first plurality of plates arranged in a one-dimensional pattern, each plate of the first plurality of plates aligned substantially with a Z-axis of the CT system and parallel with x-rays directed to the direct conversion material that emit from a focal spot of the high frequency electromagnetic energy projection source.

23. The CT system of claim 22 wherein the anti-scatter collimator further comprises a second plurality of plates substantially aligned with an X-axis of the CT system and parallel to an axis perpendicular to an axis of the first plurality of plates.

24. The CT system of claim 21 wherein the anti-scatter collimator is a monolithic collimator molded to have an array of openings in a fanned pattern that is substantially aimed toward a focal spot of the high frequency electromagnetic energy projection source.

25. The CT system of claim 21 wherein the collimator comprises a plurality of stacked, etched plates.

* * * * *

UNITED STATES PATENT AND TRADEMARK OFFICE
CERTIFICATE OF CORRECTION

PATENT NO.         : 7,486,764 B2                                          Page 1 of 1
APPLICATION NO. : 11/625969
DATED              : February 3, 2009
INVENTOR(S)        : Tkaczyk et al.

It is certified that error appears in the above-identified patent and that said Letters Patent is hereby corrected as shown below:

In Column 11, Line 48, in Claim 9, delete "region" and insert -- region. --, therefor.

In Column 12, Line 41, in Claim 21, after "positioned" delete "adjacent to the x ray blocker and".

Signed and Sealed this

Fourteenth Day of July, 2009

JOHN DOLL
*Acting Director of the United States Patent and Trademark Office*